2 Sheets--Sheet 2.
C. JEWELL.
Grain-Binders.
No. 150,050. Patented April 21, 1874.
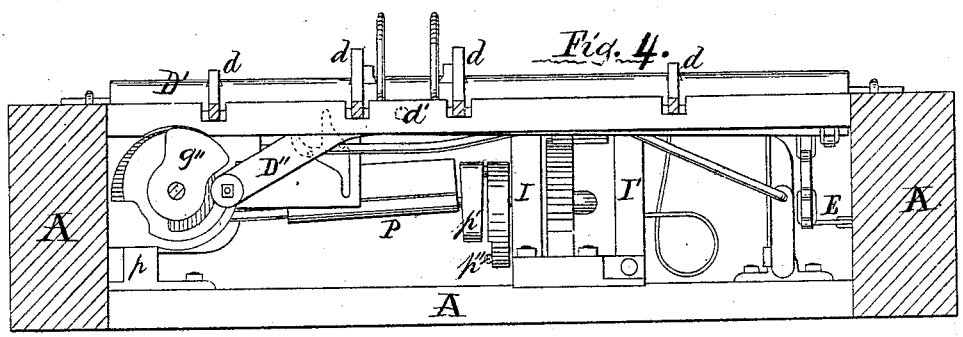
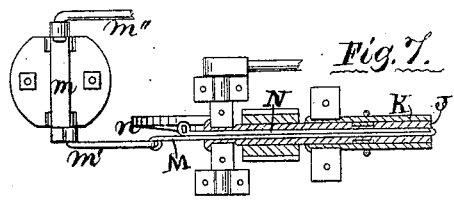
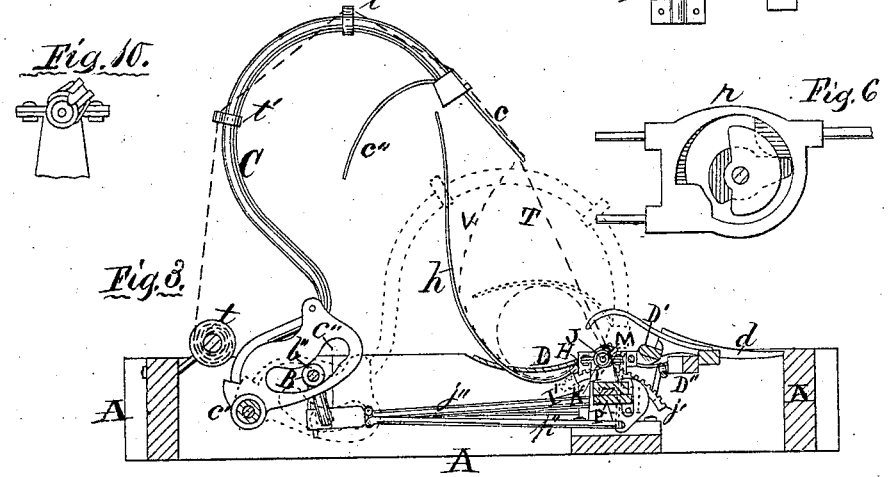
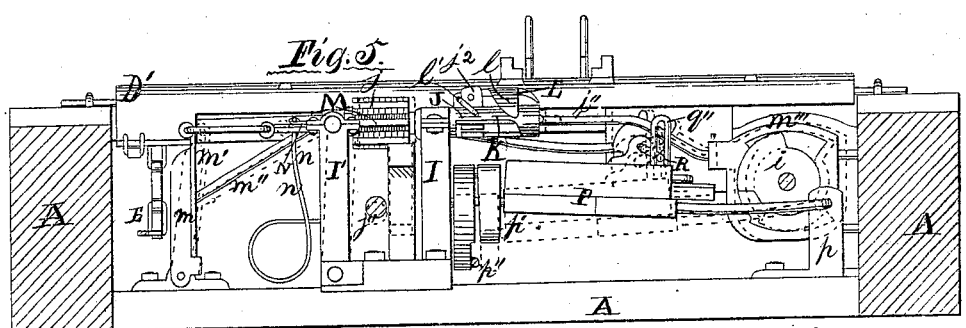
Witnesses:
A. McCallum
D. C. Stuart
Inventor:
Charles Jewell,
by W. B. Richards,
atty.

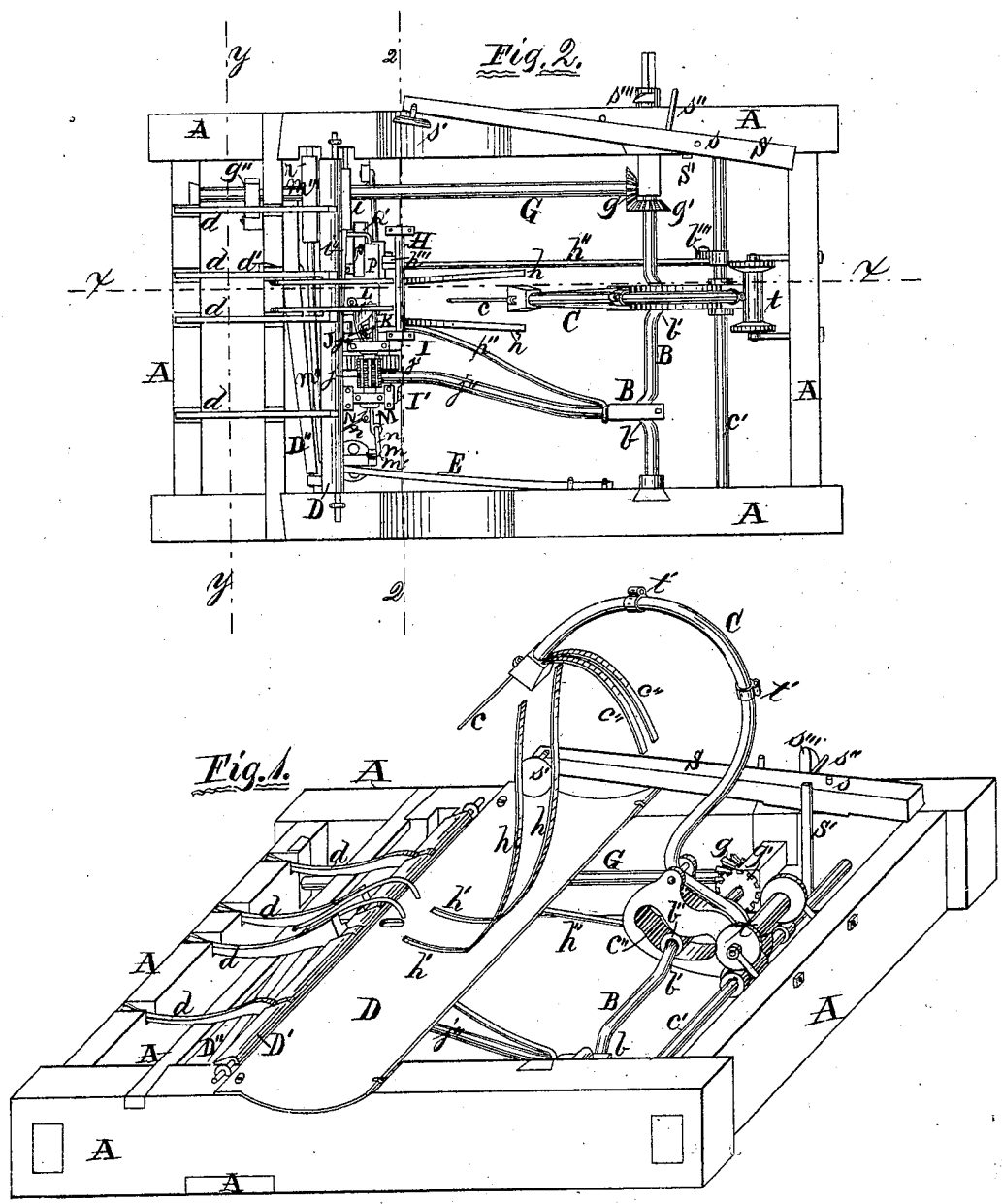

UNITED STATES PATENT OFFICE.

CHARLES JEWELL, OF MONMOUTH, ILLINOIS.

IMPROVEMENT IN GRAIN-BINDERS.

Specification forming part of Letters Patent No. 150,050, dated April 21, 1874; application filed February 11, 1874.

*To all whom it may concern:*

Be it known that I, CHARLES JEWELL, of Monmouth, county of Warren and State of Illinois, have invented certain Improvements in Automatic Binders for Harvesting-Machines, of which the following is a specification:

The nature of my invention relates to improvements in that class of harvester-binders in which the grain in gavels is received from the harvester-platform, where, by suitable mechanism, a band of any suitable cord is passed around each gavel, then tied, cut off, and the gavel removed from the binder-platform; and the invention consists, first, in the arrangement of mechanism for tying the knot on the bands; second, in the arrangement of the devices for cutting off the cord after the knot is tied; third, in the arrangement of a knocker operated by the main shaft for the purpose of removing the gavels after they are tied; and, finally, for various devices hereinafter fully described in their arrangement and purpose.

In the accompanying drawings, Figure 1 is a perspective view of a machine embodying my invention. Fig. 2 is a top plan of Fig. 1, with the platform for gavel removed. Fig. 3 is a vertical sectional view of Fig. 2 on the line $x\ x$. Fig. 4 is a vertical sectional view of Fig. 2 on the line $y\ y$, looking to the right hand. Fig. 5 is a vertical sectional view of Fig. 2 on the line 2 2, looking to the left hand; and Figs. 6, 7, 8, 9, and 10 are detail views, described hereinafter.

Referring to the parts by letters, A represents the frame, carrying the working devices. It may be attached to the harvester in any suitable manner, and may be supported and carried on any suitable slides or wheels. B is the main driving-shaft, and may receive proper motion by band or gear wheel from the harvester, and is provided with two cranks, $b\ b'$. C is the needle-arm, carrying the needle $c$ in its free end, and its other end secured to a shaft, $c'$. Motion is given to the needle-arm C by the crank $b'$, working in a curved slot, $c''$, near the enlarged end and journaled end of the needle-arm, as shown at Figs. 1 and 3, an anti-friction wheel, $b''$, being carried on the crank $b'$. D is the curved platform, on which the gavel is received to be operated upon. D′ is a shaft having suitable journal-bearings in the side frame-pieces, and provided with fingers $d\ d\ d$. D″ is a lever, pivoted, near its central portion, at $d'$, to one of the transverse frame-pieces, and connected at one end, by a stirrup-coupling, to one side and end of the shaft D′. E is a spring, connected at one end to one of the side frame-pieces, and at its other end to one side of the shaft D′ in such manner as to hold the shaft D′ in a position to keep the fingers $d\ d\ d$ turned down into the position shown at Figs. 1, 2, 3, 4, and 5. G is a shaft, provided with suitable bearings, and carrying on one end a pinion, $g$, which gears with a pinion, $g'$, on the main shaft B, and provided at its other end with a wiper, $g''$, which, at each revolution of the shaft G, impinges on the end of the lever D″, pressing it down, and, by elevating its other end, partially rotating the shaft D′, and thereby throwing the fingers $d\ d\ d$ up into the position shown at Fig. 3. H is a shaft journaled in suitable bearings in the platform D, and provided with curved fingers $h\ h$, which project upwardly through slots $h'\ h'$ in said platform. $h''$ is a connecting-rod between a crank, $h'''$, on the shaft H, and a crank, $b'''$, on the shaft $c'$. An inspection of the drawings, so far as described, will show to any one skilled in the art that while the fingers $d\ d\ d$ are in the position shown by full lines in the drawings they will be in position to receive the grain from the harvester, the fingers $h\ h$ being at the same time thrown back into the position shown by full lines at Fig. 3, and the needle-arm be elevated, as also shown by full lines at Fig. 3; the further movements being the fingers $d\ d\ d$, thrown up by the tappet $g''$ and lever D″, thus throwing the gavel back upon the platform D, when the fingers $h\ h$ advance and compress it, while the needle-arm descends and the aforesaid parts assume the relative positions shown by dotted lines at Fig. 3, and the operation of tying is performed, as described hereinafter. The arms $c''\ c''$, projecting from the needle-arm, aid in compressing the gavel, as plainly shown by the dotted lines at Fig. 3. I I′ are the standards supporting the knot-tying devices, the standard I being stationary and the standard I′ pivoted or hinged at its base to allow an oscillating movement toward and from the standard I, which movement is produced by a cam, $i$, on the shaft G, connected with it by a rod, $i''$. (See Fig. 5.) J is a hollow shaft provided with suitable bearings in the standards I I′, and having collars on each side of its bearing in the shaft I; so that it will be reciprocated by the oscillations thereof. $j$ is a pinion on the shaft J, and gears with a segmental gear, $j'$, from which it receives an intermittent rotary motion through the connecting-rod $j''$ from the crank $b$. K is a sleeve on the projecting end of the shaft J, and is slotted longitudinally on its opposite sides for the projecting arm $j^2$ from the shaft J, and is enlarged on each side of its bearing in the standard I, to prevent longitudinal movement. L is a catch, formed, as shown at Fig. 5, with a hooked outer end, and with side arms $l$, and is pivoted, near its central part, to the arm $j^2$, and is connected, by a link, $l'$, at its rear end, with the sleeve K in such manner that, when the shaft J is reciprocated through said sleeve, the hook L, or its outer end, will be alternately pressed to and from the outer end of the shaft J. M is a rod, passing through the hollow shaft J, and provided with a hook at its outer end, and connected at its inner end to a vibrating frame, $m$, by a spring-bar, $m'$. $m''$ is a rod, connecting the vibrating frame $m$ with a cam, $m'''$, on the shaft G. N is a bar, resting alongside of the hook-bar M, and connected, at its rear end, to a spring-bar, $n$, in such a manner that, when the spring-bar M is retracted, the end of the bar N will rest against the hook on its outer end, and, when the bar M is projected, the shoulder on the rear end of the bar N will prevent it following the hook M. P is the device for cutting off the cord after the knot is tied, the main frame of which is suspended or attached by arms to standards $p$ $p$, (see Fig. 5,) so as to allow it (the frame P) being oscillated, or raised and lowered. The free end of the frame P is connected, by a swinging arm, $p'$, to a crank-plate, which is in turn connected by a connecting-rod, $p''$, to the crank $b$, for the purpose of giving it the rising-and-falling motion. Q is a slide, arranged to have a longitudinal reciprocating movement within the frame P, a top view of which is shown at Fig. 9, with the frame P partly broken away to show the diagonal slots $q$ $q$ in the slide Q. $q'$ is the hole through the frame P, through which the needle $c$ passes in descending, and its edge next the upper surface of the slide Q is sharpened to cut off the thread, as hereinafter described. $q''$ is a staple projecting upward from the slide Q, through a slot in the frame P. R is a crank working in the staple $q'$, to reciprocate the slide Q forward as the needle $c$ descends once, and back as it descends again. The crank R receives the proper intermittent movement from a crank-wheel, having a suitably-shaped cam cut therein, in which two pins work, which are attached to a plate, which in turn is connected to and receives motion from a cam, $r$, on the shaft G. S is a lever, pivoted on the main frame at $s$, and carrying at one end a disk, $s'$. $s''$ is a projecting pin from the lever S. $s'''$ is a wiper or tappet on the shaft B, and at each revolution of the shaft B the tappet $s'''$ will strike the arm $s''$, and thus throw the disk $s'$ and its connected end of the lever S forward, where, striking the gavel just after the binding is completed, it will throw it from the platform D, and a spring, S', will return the lever to its original normal position. T is the binding-cord, carried on a spool, $t$, and passing through loops $t'$ $t'$, on the needle-arm C, to the needle $c$, where it passes through an eye in its point, and downward to where it is held through and beneath one of the diagonal slots $q$.

The thread or cord being now in the position shown by dotted lines at Fig. 3, it will be seen that, if the gavel is thrown backward against it, the cord will yield and allow it to fall into position shown by the dotted lines V, Fig. 3, when the needle-arm descending will encircle the gavel with the cord, and the needle carry the cord down into frame P just past and opposite one of the diagonal slots $q$, when the slide Q moving, will cut off the two left-hand sides, and leave the right-hand side or end—the end which extends upward to the needle—firmly held beneath the side of the slide Q for another similar operation, the knot having been tied just previous to said ends having been cut off, as follows: While the two ends to be tied are both downward and crossing the projecting end of the shaft J, the operations, hereinbefore described, will throw down the outward point of the hook L, which will hold the cords in place while the whole tying device is rotated until the cord comes into such position that the projecting hook M seizes the outer thread or cord where they are crossed, and, drawing it within the hollow sleeve K, will form a common loop-knot, the cord in the meantime being held securely between the hook M and the end of the rod N, the hook M being again projected to release the cord just in time for the sweep-lever S to remove the gavel.

It will be seen that the rising movement of the frame P will occur in the proper time to allow for slack cord necessary while the tying device is being encircled with the same.

I claim—

1. The hollow shaft J, sleeve K, catch L, and hook-rod M, and rod N, arranged to operate, with the frame P and needle $c$, substantially as described, and for the purpose specified.

2. The slide Q, constructed as described, and arranged to operate, with the frame P, needle $c$, and its operating devices, substantially as described, and for the purpose specified.

3. The shafts B and $c'$, and needle-arm C, arranged to operate with the connecting-rod $j''$, segmental gear $j$, and pinion $j'$, when combined and arranged to operate, with the tying device and cutting device, substantially as described, and for the purpose specified.

CHARLES JEWELL.

Witnesses:
N. B. JENNINGS,
SAML. N. GROSE.